United States Patent [19]

Gurr

[11] 4,423,335
[45] Dec. 27, 1983

[54] ENERGY CONTROLLER AND METHOD UTILIZING BI-METAL ELEMENTS TO ADJUST THERMOSTAT SETTING AND TO SHED AND RESTORE CONTROLLED LOADS IN PRIORITIZED ORDER

[75] Inventor: George P. Gurr, Phoenix, Ariz.

[73] Assignee: Cyborex Laboratories, Inc., Phoenix, Ariz.

[21] Appl. No.: 336,939

[22] Filed: Jan. 4, 1982

[51] Int. Cl.³ .............................................. H02J 3/14
[52] U.S. Cl. ....................................... 307/31; 307/39; 307/41
[58] Field of Search ...................... 307/31, 38, 39, 41, 307/117; 340/310 A

[56] References Cited

U.S. PATENT DOCUMENTS 4,135,101 1/1979 Young et al. ......................... 346/39

Primary Examiner—Elliot A. Goldberg
Assistant Examiner—Todd E. DeBoer
Attorney, Agent, or Firm—Cahill, Sutton & Thomas

[57] ABSTRACT

A residential energy controller includes a first bi-metal element having a free end and a stationary end. A second bi-metal element has a first end connected to the free end of the first bi-metal element. The second bi-metal element is included in a thermostat that controls an air conditioning apparatus for cooling the residence. A sensing device senses current delivered to the residence and produces a corresponding sense current. The first bi-metal element is electrically resistive. The sense current is forced through the resistive material of the first bi-metal element, causing it to be heated to a temperature that is related to the amount of power being delivered to the residence, thereby causing the free end of the first bi-metal element to rotate and causing the entire second bi-metal element to rotate. This causes the turn-on tempreature of the thermostat to be increased by an amount related to the total power being delivered to the residence. A switching device mechanically connected to the first bi-metal element causes a hot water heater of the residence to be turned off as a result of rotation of the first bi-metal element caused when the air conditioning apparatus is turned on.

24 Claims, 9 Drawing Figures

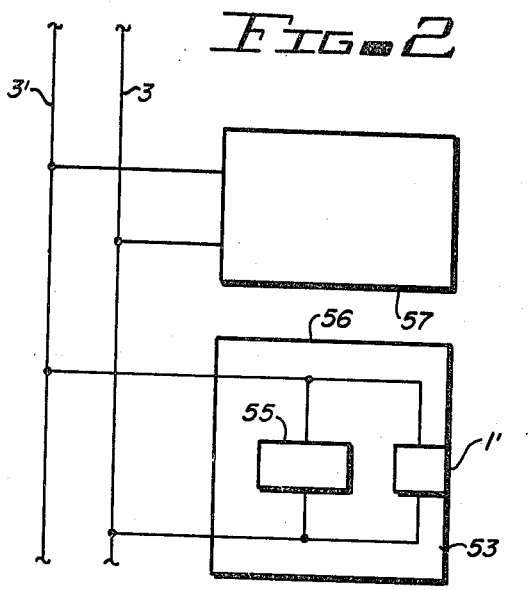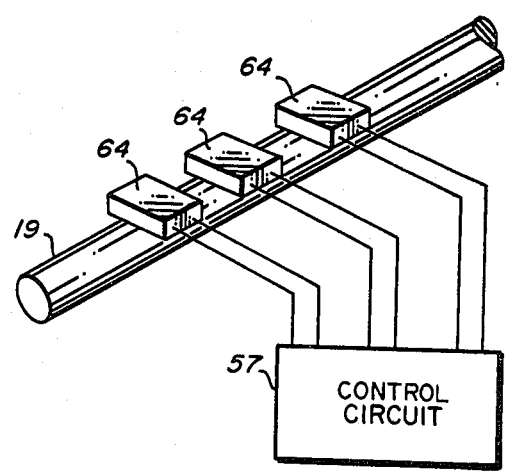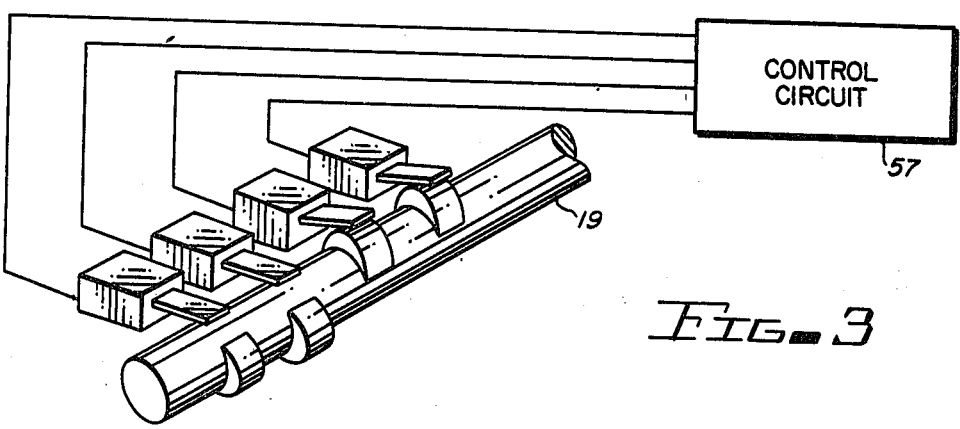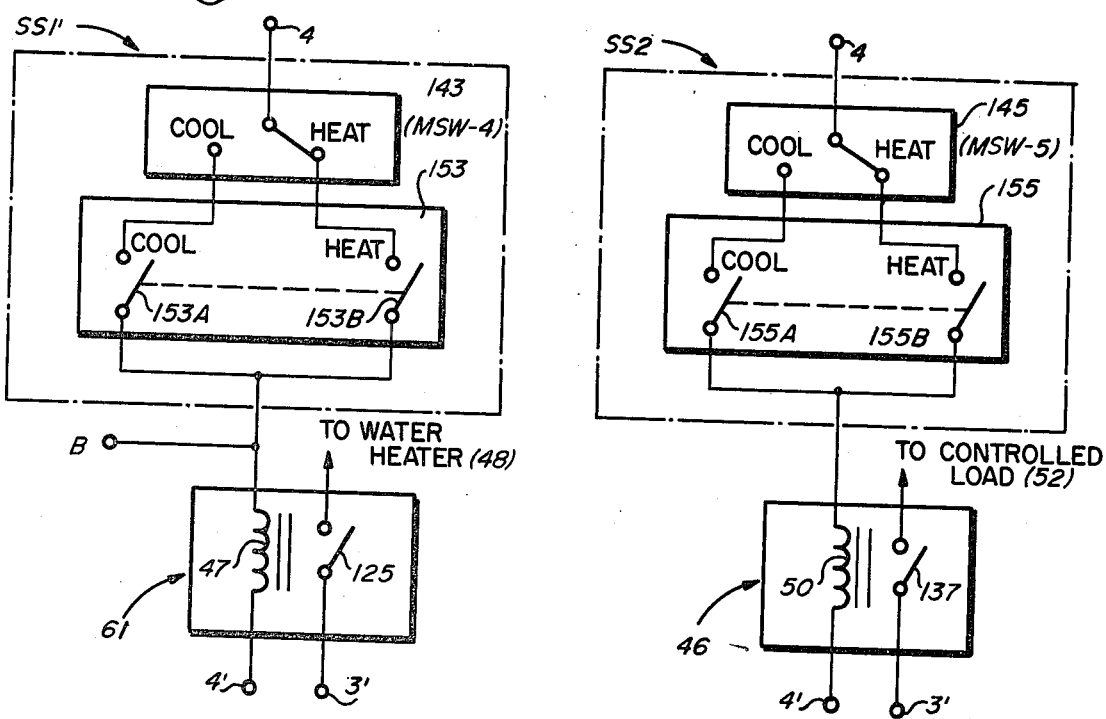

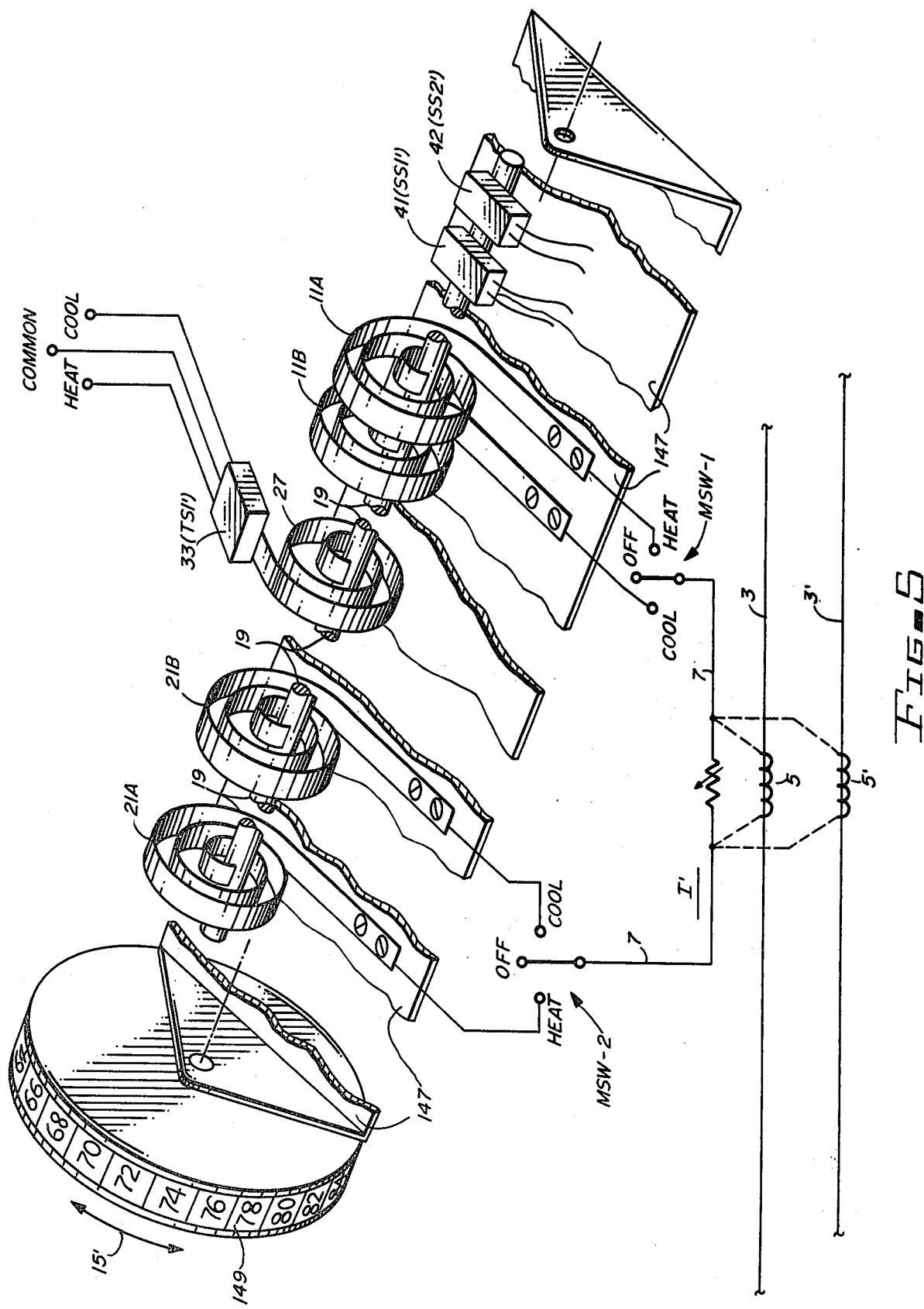

ENERGY CONTROLLER AND METHOD UTILIZING BI-METAL ELEMENTS TO ADJUST THERMOSTAT SETTING AND TO SHED AND RESTORE CONTROLLED LOADS IN PRIORITIZED ORDER

BACKGROUND OF THE INVENTION

The invention relates to electrical energy management systems that shed and restore prioritized controlled loads in such a manner as to minimize peaking of power consumption of a resistance with minimum impact on the life-style of residential occupants in order to maximize utility company revenue by keeping power consumption close to a level that utilizes as much as possible of the utility company's capacity to generate electrical power from hydroelectric, nuclear, coal-fired and other generating sources that have relatively low operating costs but require very large capital outlays to construct, thereby avoiding the need for the utility company to use oil or gas powered peak load generating sources that sharply increase the rates that must be charged to utility customers.

A number of power controllers or energy controllers useful for shedding and restoring controlled loads in a residence have been proposed, including those disclosed in commonly assigned copending applications "System and Method for Optimizing Shed/Restore Operations for Electrical Loads" Ser. No. 191,424, filed Sept. 26, 1980 by Hedges et al. and "System and Method for Optimizing Power/Shed Restore Operations", Ser. No. 274,488, filed June 17, 1981 by Gurr et al. Commonly assigned issued U.S. Pat. No. 4,247,786 are indicative of the state of the art. U.S. Pat. No. 3,652,838; U.S. Pat. No. 3,906,242; U.S. Pat. No. 4,023,043; U.S. Pat. No. 4,059,747; U.S. Pat. No. 4,064,485; U.S. Pat. No. 4,075,699; U.S. Pat. No. 4,146,923; U.S. Pat. No. 4,168,491; U.S. Pat. No. 4,181,950; and U.S. Pat. No. 4,216,384 also are believed to be generally indicative of the state of the art for energy controllers.

The various energy controllers disclosed in these references are intended to keep peak power usage by residential customers approximately below a predetermined level while maintaining the total cumulative amount of energy used by customers relatively unchanged, thereby postponing use of certain electrical loads when such postponing does not cause undue inconvenience to the residential customers.

Some of the energy controllers described in the above references are relatively complex, computer-controlled devices that utilize control panels by means of which the customer selects a peak limit to the amount of power that can be (instantaneously) consumed by the residence. The various loads that are controlled by the energy controllers are connected to the controller in order of relative priorities of the loads. The above-described energy controllers shed and restore loads in certain predetermined priorities in accordance with various shed/restore algorithyms executed by the computers in order to maintain power delivered to the residence approximately below the preselected peak limit while hopefully causing a minimum amount of inconvenience to the residential customer.

Experience has shown that complex controllers have certain disadvantages. One disadvantage is that some residential customers "tinker" with the control panel settings so frequently that the purpose of the energy controller is often defeated because the user occasionally by-passes the originally set peak power limit, causing the controller to allow a very high amount of peak power to be delivered to the controlled loads. This results in a high billing rate for the entire billing period during which the control panel was tinkered with. The customer is likely to be dissatisfied with the operation of the controller because it does not save him any money but does cause him some inconvenience.

It has been found that the hardware used in implementing the above-mentioned control panels is very expensive, and constitutes a substantial portion of the total hardware cost of some prior residential energy controllers.

The present assignee's experience in testing energy controllers seems to suggest that peak power consumption by many residential customers, in summer months, at least, is determined mainly by only a few controlled loads, namely, the air conditioner, the hot water heater, and in some cases, a swimming pool filter pump. Numerous remaining appliances frequently operated in most residences, such as dishwashers, washing machines, electric lights, vacuum cleaners, etc. frequently have a very minor impact on the peak power usage pattern for that residence, indicating that in many cases the peak power usage would be essentially uneffected even if these other appliances are not controlled by a residential energy controller.

Testing and simulation experiments with various shed/restore algorithyms have suggested that such algorithyms often result in unexpected or anomalous behavior when used in residences for a long period of time. For example, some algorithyms result in an excessive amount of switching of controlled loads. Since excessive switching of most electrical appliances can reduce their useful life and may also be very inconvenient to the residential customer, this excessive switching is obviously undesirable. In some instances it has been found that certain controlled loads are rarely switched off by the controller, and in other instances, low priority loads may be switched off by the controller but rarely switched back on.

In most residences, there are a number of unpredictable, temporary sharp increases in the amount of energy required by that residence. For example, overnight visits by a large number of guests may cause some energy controller algorithyms to operate in a manner that is highly inconvenient to the residential customer.

For many residential customers, it appears that a more simplified approach to residential energy control to prevent excessively high peak power consumption while causing minimum impact on the residential users lifestyle is needed. One known device attempts to accomplish this objective by providing a simple "interlock" device which automatically disconnects the water heater every time the air conditioner is turned on by the thermostat sensing room temperature within the residence. However, this approach is believed to be overly simplified. Even though advantageous operation may be achieved by this device under summer conditions wherein a predetermined peak power limit will be exceeded every time the air conditioner is turned on, it may be desirable in some instances to have a load control that turns both the air conditioning unit and the hot water heater off when the power consumed by other loads exceeds a certain level. The above described interlock device cannot perform this function. Obviously, the above-mentioned interlock device is essentially useless during the winter months in a home that does not utilize the same unit (i.e., a heat pump) both to heat and cool the residence.

Thus, the air conditioner/water heater interlock device fails in many instances to achieve the desired objectives of minimizing peak power consumption of the residence while also minimizing inconvenience to the user while keeping the total cumulative energy consumption at normal levels.

The present assignee's experimental results also suggest that a fixed maximum peak load limit that, if exceeded, causes shedding of loads can cause highly ineffective use of energy controllers during portions of the year when it is unlikely that high peak power consumption will occur even if no energy controller is used at all. For example, in a home heated by natural gas, excessive peaking of power consumption normally will occur only in the summer. For example, assume that in such a home an energy controller begins shedding controlled loads at predetermined demand limit of eight kilowatts in the summer when total power consumption with the air conditioning unit is turned on. It is quite likely that the energy controller will never shed any load during the winter months. Consequently, during the winter, no benefit is obtained by the residential customer from the energy controller. Nevertheless, peaking of the residence power consumption does occur, albeit at lower levels in the winter for such a residence, and such peaking may occur within a price-sensitive power range. Any time substantial peaking of power consumption by a residence occurs within a price-sensitive power range, there is an opportunity for savings on the energy billing rate if some power usage during the peaking period can be postponed. Therefore, if prioritized load shedding and load restoring operations are effected, a reduced rate for that residential consumer can result, and this reduced rate can be achieved with minimum inconvenience to him if the energy controller is properly designed.

Several prior art references, including U.S. Pat. No. 2,874,310; U.S. Pat. No. 3,970,861; 4,135,101 disclose use of bi-metal temperature sensitive elements that are heated in response to the total amount of power output from a typical power distribution transformer in a residential neighborhood. When the total output power reaches a certain level, the temperature sensitive bi-metal element (which is gradually deflected as a function of its increased temperature) actuates a switch. The actuation of the switch results in signals that are utilized to energize motors that drive cams which, in turn, cyclically turn controlled loads off and on to reduce the peak power consumed by loads served by the transformer. The devices disclosed in the three foregoing references do not provide any adjustment in the temperature setting of thermostats that control switching of the air conditioning units or heating units, both of which may be responsible for a major portion of the power demand of a particular residential customer, and both of which may greatly impact the comfort and lifestyle of the residential user if "mismanaged" by an automatic energy controller.

It can be seen that despite all of the research and development that has occurred in the field of residential energy controllers in recent years, there still remains an unfulfilled need for a low cost, highly reliable "tinkerproof" automatic energy controller that substantially reduces peak power consumption by a residence without substantial inconvenience to the residential user, thereby reducing energy billing rates for that user without unacceptable impact upon his lifestyle.

Therefore, it is an object of the invention to provide an energy controller system and method that avoid the high cost and the great complexity of structure and operation of many prior energy controllers, especially those utilizing processors to control load shedding and restoring operations.

It is another object of the invention to provide an energy controller and method that automatically seasonally varies peak power consumption limits which, if exceeded by the residence, cause shedding of controlled loads.

It is another object of the invention to provide an energy controller and method which result in avoidance of increased electric utility power rates for a billing period based on peak power consumption during that billing period, and which avoid increased electric utility power billing throughout the year.

It is another object of the invention to provide an energy controlling system and method that automatically varies the setting of a thermostat in accordance with the amount of power being delivered to a residence or establishment.

SUMMARY OF THE INVENTION

Briefly described, and in accordance with one embodiment thereof, the invention provides an energy controller for reducing or curtailing "peaks" in the amount of electrical power or current delivered to an establishment by avoiding simultaneous operation of first and second controlled loads, the energy controller including a first temperature sensitive bi-metal element, a sensing circuit for sensing the total power or current being delivered to the establishment, the first bi-metal element being heated in response to changes in the sensed total power or current and deflecting a corresponding amount, the energy controller also including a second bi-metal element operatively coupled to the first bi-metal element, the second bi-metal element being deflected in response to the deflection of the first bi-metal element, the second element being a temperature sensitive element of a thermostat and further deflecting in response to changes in ambient temperature, whereby the set point at which a first switch of the thermostat actuates as ambient temperature changes is varied as a function of the total power or current delivered to the establishment.

In the described embodiments of the invention, a second switch is actuated in response to a predetermined amount of total deflection of the second bi-metal element to control an air conditioner or heater. In the embodiments of the invention controlling an air conditioner, the room temperature set point at which the air conditioner is turned on increases as the total power or current delivered to the establishment increases, thereby raising the effective thermostat setting for the air conditioner when electrical loading of the establishment is high, as may occur during the afternoon of a hot summer day when the total electric loading by the air conditioner and other electrical loads is at a peak. The room temperature at which the air conditioner is turned on automatically decreases due to deflection in the opposite direction of the first bi-metal element as the total power or current delivered to the establishment decreases, thereby lowering the room temperature thermostat setting when electrical loading of the establishment is relatively low, for example, later on in the evening of the hot summer day. In the described embodiments of the invention, the bi-metal elements are configured as spiral coils and cause rotation of a rod or shaft as their respective temperatures increase or decrease. The first bi-metal element is electrically resistive and functions as a self-heater in response to current output by the sensing circuit, the current output being approximately proportional to the total power or current being delivered to the establishment. In the described embodiments of the invention, a second switch is actuated in response to a predetermined amount of deflection of the first bi-metal element to control a water heater. When the air conditioner is turned on by the first switch, the first switch also immediately turns the water heater off, thereby avoiding increasing the peak power or current by an amount that is as large as the sum of the power or currents delivered to both the air conditioner and the water heater when both are on. When the total power or current delivered to the establishment increases due to turning on of any loads, two things occur. First, the additional increase required to actuate the second switch is reduced, so the set point of the thermostat of the air conditioner in effect is increased. If the increase in total power or current to the establishment is great enough to cause the first bi-metal element to actuate the second switch, the water heater is shed, i.e., operatively disconnected from the power line. Also, the set point of the thermostat of the air conditioner is increased to a particular temperature, but if the room temperature rises to that particular temperature, the air conditioner turns on despite the high total power or current being delivered to the establishment. Thus, while excessive peaking of the total power or current to the establishment is reduced at room or ambient temperature below an upper limit temperature (which may be a harmful upper limit temperature), the energy controller automatically prevents that upper limit temperature from being exceeded despite the peaking of the total power or current being delivered to the establishment. In another embodiment of the invention, a plurality of switches are sequentially actuated in response to deflection of the first bi-metal element to sequentially shed and/or restore a plurality of corresponding controlled loads as the total power or current delivered to the establishment increases or decreases, respectively. In one embodiment of the invention, the controller controls a heater, rather than an air conditioner. In another embodiment of the invention, the controller controls both the air conditioning and heating functions of an electric heat pump.

BRIEF DESCRIPTION OF THE DRAWINGS

FIG. 2 is a diagram useful in describing the environment in which the device of FIG. 1 is utilized.

FIG. 3 is a partial schematic drawing useful in describing an alternative embodiment of the invention.

FIG. 4 is a schematic drawing useful in describing another alternate embodiment of the invention.

FIG. 5 is a schematic diagram of an alternate embodiment of the invention.

FIGS. 6A and 6B are schematic diagrams illustrating in more detail a portion of the circuitry of FIG. 6.

DESCRIPTION OF THE INVENTION

Figure 1:
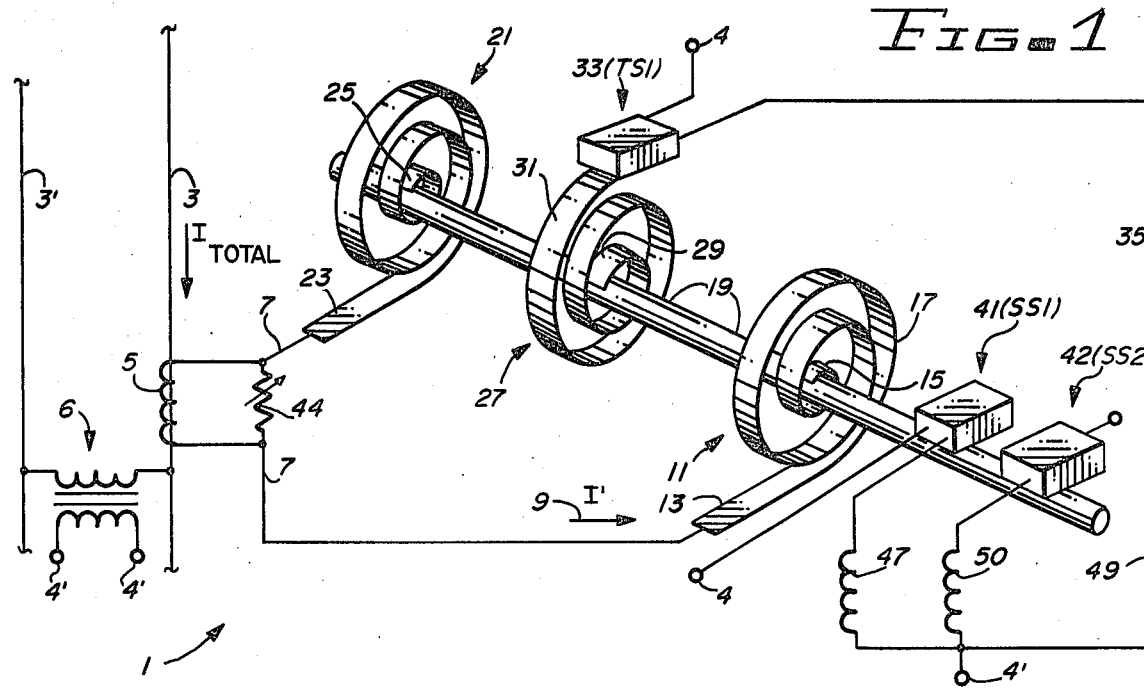
FIG. 1 is a schematic diagram useful in describing the structure and operation of the energy controller and method of the present invention.

Referring now to the drawings, FIG. 1 discloses an energy controller 1 that operates to perform several functions, the first function being to automatically increase the temperature setting where at an initially open air conditioner thermostat switch 33 closes as a function of increasing power or load current $I_{total}$ delivered to a residence. The second function is to "shed" a water heater by opening a switch of a control relay every time the air conditioner turns on. Energy controller 1 also sequentially sheds the water heater and other controlled loads if the total power or current $I_{total}$ delivered via power lines 3 and 3' to the load 55 (see FIGS. 1A and 2) of a residence exceeds corresponding successively increasing predetermined values, respectively.

In FIG. 1, reference numerals 3 and 3' designate power line conductors through which the total current $I_{total}$ flows to a residence 56, shown in FIG. 2. More particularly, in FIG. 2, it is seen that two AC power lines 3 and 3' are connected to each of a plurality of residences, including residences 56 and 57. Residence 56 is shown as having a load 55 connected in conventional fashion between power lines 3 and 3'; the AC current $I_{total}$ flows in both of the power lines 3 and 3'. In accordance with the present invention, load 55 includes "controlled" loads, which are automatically disconnected from (i.e., are shed) or reconnected (i.e., restored) to power lines 3 and 3'. For more detail on the nature of controlled and uncontrolled loads, see allowed commonly assigned pending patent application "System and Method for Optimizing Shed/Restore Operations for Electrical Loads", Ser. No. 191,424, filed Sept. 26, 1980, by Hedges et al., incorporated herein by reference.

Referring back to FIG. 1, energy controller 1 includes a coil 5 through which power line 3 extends. Coil 5 produces a sense current I' designated by reference number 9 in FIG. 1. Sense current I' is proportional to $I_{total}$. Two conductors 7 are connected to opposite terminals of coil 5.

One of conductors 7 is also connected to one end of a bi-metal coil 11. Bi-metal coil 11 can be of conventional structure including two adjoining, sandwiched layers of metal material each having different thermal expansion coefficients. A wide variety of such bi-metal material from which bi-metal coils and other metal elements can be constructed is readily available commercially.

Bi-metal coil 11 has an outer end portion 13 electrically connected to conductor 7 and an inner end portion 15 that is attached to and electrically connected to a conductive rod or shaft 19. A second bi-metal coil 21, which can be identical to bi-metal coil 11, has an outer end 23 connected to the other conductor 7 and an inner end portion 25 connected to conductive rod 19. Bi-metal coils 11 and 21 each have a predetermined electrical resistance selected so that sufficient resistive heating thereof occurs that changes in I' flowing through bi-metal coils 11 and 21 cause significant rotation of rod 19. It can be seen that sensing coil 5, conductors 7, bi-metal coils 11 and 23, and rod 19 form a closed loop through which sense current I' flows. The dimensions of bi-metal coils 11 and 21 are selected to achieve the above-mentioned resistances of bi-metal coils 11 and 21.

Thus, as the total current $I_{total}$ to the residence increases, sense current $I'$ also increases, thereby increasing the temperature of bi-metal coils 11 and 21. This causes bi-metal coils 11 and 21 to expand. (In some cases, bi-metal coils 11 and 12 can be arranged so that they contract, rather than expand, as their temperatures increase.) The thermal expansion of bi-metal coils 11 and 21 causes clockwise rotation of conductive rod 19, as the load 55 of residence 56 demands more line current.

A third bi-metal element 27 has an inner end portion 29 attached to conductive rod 19 and a free outer end portion 31.

Figure 1A:
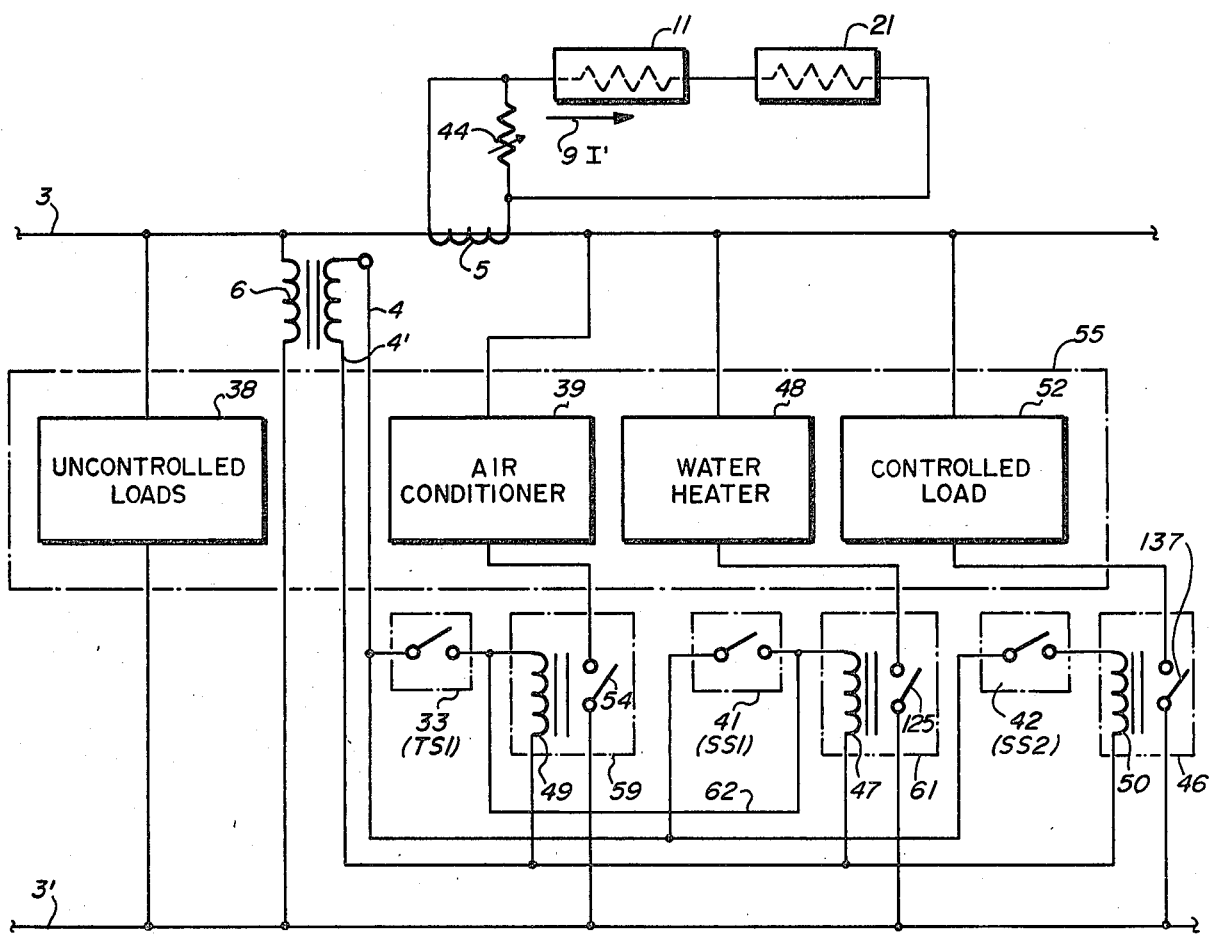
FIG. 1A is a schematic diagram that is useful in conjunction with FIG. 1 is describing one embodiment of the invention.

Bi-metal element 27 is a thermostat control element. A mercury switch 33 is attached to free end 31. Mercury switch 33, also designated as switch TS1 (thermostat switch 1) is assured to be initially open. One terminal of mercury switch TS1 is connected to step-down transformer terminal 4, and the other terminal thereof is connected to relay coil 49. Relay coil 49 is also connected to step-down transformer terminal 4'. When switch TS1 rotates sufficiently far counterclockwise, the liquid mercury therein flows to conductively bridge the gap between the terminals of switch TS1, thereby "closing" switch TS1. This electrically connects terminal 4 of step-down transformer 6 to relay coil 49. (Note that transformer 6 steps the voltage between power line conductor 3 and 3' to a lower voltage between terminals 4 and 4'. The lower voltage can be used to energize the various subsequently described relay coils.) Coil 49 then activates relay switch 54 of relay 59 to connect air conditioner 39 between power line conductors 3 and 3', as shown in FIG. 1A.

Two initially open mercury switches 41 and 42 are mounted on rod 19. Switch 41 is also referred to as switch SS1. One terminal of switch SS1 is connected to step down transformer terminal 4, and the other terminal switch of SS1 is connected to one terminal of water heater control relay coil 47. The other terminal of relay coil 47 is connected to step down transformer terminal 4'. The other terminal of switch SS1 is connected to relay coil 47, which actuates switch 125 of relay 61 to disconnect water heater 48 between power lines 3 and 3'. One terminal of mercury switch SS2 is connected to transformer terminal 4, and the other terminal of switch SS2 is connected to relay coil 50 of relay 46. Relay coil 50 is also connected to transformer terminal 4'. Relay 46 includes normally closed switch 137, which is opened to shed controlled load 52 when relay coil 50 is energized.

A variable resistor 44 is connected in shunt across coil 5. Variable resistor 44 can be adjusted to vary the sensitivity, i.e., the relationship between $I_{total}$ and the "level" of curtailment of peak energy usage caused by energy controller 1.

The "quasi-perspective" diagram of FIG. 1 is useful in illustrating the relationship of line current sensing coil 5, bi-metal elements 11 and 21, bi-metal element 27, conductive rod 19, the three switches TS1, SS1 and SS2, and the two control relay coils 47 and 49. However, the manner in which the structure disclosed in FIG. 1 controls an air conditioner and a water heater can be more easily understood when considered in conjunction with FIG. 1A. In FIG. 1A, dotted line 55 designates the total combined electrical load associated with residence 56 of FIG. 2; reference numeral 38 (FIG. 1A) designates all uncontrolled loads (i.e., loads not controlled by energy controller 1) in residence 56. Reference numeral 39 designates an air conditioner of residence 56, reference numeral 48 designates the water heater of residence 56, and reference numeral 52 designates one of a plurality of additional controlled loads (i.e., loads which are controlled by energy controller 1 to curtail "peaking" of the total power or current delivered to residences 56). Air conditioner 39 and water heater 48 clearly are both controlled loads. Air conditioner 39 is coupled between power lines 3 and 3' by air conditioner control relay 59. The air conditioner control relay coil is designated by reference number 49 in both FIGS. 1 and 1A. Water heater 48 is coupled between power lines 3 and 3' by water heater control relay 61, the control relay coil of which is designated by reference numeral 47. Relay 61 is actuated in response to closing of mercury switch SS1. Controlled lead 52 is coupled between power conductors 3 and 3' by relay 46, which is actuated in response to mercury switch SS2.

It should be noted that switches SS1, SS2, and TS1 of FIG. 1 are shown in FIG. 1A, but rod 19, the bi-metal elements 11, 21, and 27, and current sensor coil 5 are not shown in FIG. 1A.

In operation, switch TS1 (which in effect is part of the thermostat of air conditioner 39) on the outer end portion 31 of middle bi-metal element 27 causes the thermostat setting to be a function not only of the temperature of the air surrounding bi-metal element 27, but also of the total present power consumption of all loads included in load 55, including all uncontrolled loads and all controlled loads in residence 56. With the direction or sense of outward spiraling of all three bi-metal elements 11, 21 and 27 being the same (i.e., following of the bi-metal coil from its inner end portion to its outer end portion results in clockwise rotation about rod 19), an increase in the total power delivered to residence 56 increases $I_{total}$, which causes $I'$ to be increased, which causes resistive bi-metal elements 11 and 21 to be further heated, causing them to expand outwardly and thereby causes clockwise rotation of rod 19. This clockwise rotation of rod 19 causes middle bi-metal element 27 to also rotate clockwise.

This changes the amount that switch TS1 needs to rotate in response to room temperature increases before it will close and thereby actuate air conditioner control relay coil 49, turning air conditioner 39 on. More specifically, it can be seen by observation of bi-metal coil 27 that counterclockwise rotation of switch TS1 of the air conditioner thermostat occurs as the room temperature around bi-metal coil 27 increases. Upon a moment's reflection, it will be seen that the above-mentioned clockwise rotation of rod 19 (resulting from an increased total load current delivered to residence 56) in effect increases the amount of counterclockwise rotation that must be produced by middle bi-metal coil 27 in response to increased room temperature in order to turn air conditioner 39 on.

In other words, increased power demand by residence 56 automatically increases the temperature setting of thermostat switch TS1.

Next, the operation of switch SS1 and switch SS2 will be discussed. Switch SS1 rotates clockwise with conductive rod 19 when the total power demand by residence 56 increases. The orientation of mercury switch SS1 on shaft 19 determines the level of $I_{total}$ at which switch SS1 will open. Recall that it is assumed that initially both of mercury switches SS1 and SS2 are open. It is also assumed that switch 125 of relay 61 is normally closed and opens when relay coil 47 is energized; switch 137 of relay 46 is normally closed and opens when relay coil 50 is energized. The mounting orientation of switch SS1 is on shaft 19 and is selected such that when the total load current $I_{total}$ delivered to residence 56 reaches a predetermined level, the amount of rotation of shaft 19 in response to resistive heating of bi-metal elements 11 and 21 causes switch SS1 to close, thereby energizing water heater control relay coil 47. This opens switch 125 of relay 61, thereby shedding water heater 48. Water heater 48 remains shed as long as $I_{total}$ exceeds a predetermined value. (Note that thermal time constants associated with bi-metal elements 11, 21 and 27 are being omitted from this discussion. Those skilled in the art will realize that because of such thermal time constants, the bi-metal elements do not respond instantly either to increases in I' or increases in room temperature. However, this omission will not impair understanding of the basic operation of the bi-metal elements and switches in energy controller 1.)

Switch SS2 also is mounted on shaft 19, and is mounted at an orientation such that when $I_{total}$ reaches a second predetermined level, which can be the same or different that the predetermined level mentioned above, the resulting rotation of rod 19 causes initially open mercury switch SS2 to close, energizing control relay coil 50, thereby opening switch 137 of relay 46 and shedding controlled load 52.

In another mode of operation of the subject embodiment of the invention, a large number of loads in residence 56 other than air conditioner 39 and water heater 48 are turned on, such that the value of $I_{total}$ is quite close to the peak level that the residence owner wishes to draw (in order to ensure that his monthly billing rate will be no greater than a predetermined amount which would be exceeded if either air conditioner 39 or water heater 48 are also on). The orientation of switches SS1 and SS2 on rod 19 are such that both SS1 and SS2 are off. Neither air conditioner 39 or water heater 49 turn on, despite ordinary increases in the room temperature around bi-metal element 27, until at least some of the foregoing "other" loads are turned off, reducing $I_{total}$, thereby causing contraction of bi-metal elements 11 and 21 and sufficient corresponding counterclockwise rotation of rod 19 to turn on air conditioner 39 and/or water heater 48.

In accordance with the present invention, the relative sensitivity of deflection of bi-metal coil 27 to changes in ambient room temperature is substantially greater than the sensitivity of bi-metal coils 11 and 21 to the same variations in ambient temperature. For example, the sensitivity of bi-metal element 27 could be approximately twice as great as that of bi-metal coils 11 and 21. Consequently, even though the total load in residence 56 other than air conditioner 39 may be sufficiently great that the "thermostat set point" of the air conditioner has been substantially increased (in the manner described above), if the room ambient temperature continues to increase, eventually the middle bi-metal coil 27 will "catch up" with load sensitive bi-metal coils 11 and 21 and turn the air conditioner 39 on despite the high amount of power being consumed by the other loads in the residence. Thus, the described embodiment of the invention prevents the room temperature from exceeding a predetermined high (possibly harmfully high) room temperature despite high loading in the residence that would cause air conditioner to be shed at lower room temperatures.

In accordance with the present invention, the device of FIG. 1 ordinarily will provide an inherent "seasonal" variation of the level of $I_{total}$ at which energy controller 1 operates to prevent peaking of power demand of residence 56 by "postponing" operation of lower priority loads (by shedding them in prioritized order, the relative priorities of the controlled loads being established by the relative orientations of various switches such as SS1 and SS3 on rod 19).

This seasonal variation tends to occur because ordinarily, residence owners tend to keep the thermostat settings in their homes higher in the summer than in the winter. For example, in the summer, the residence owner may set the thermostat at approximately 80° so that the air conditioner will turn on when the room temperature exceeds approximately 80° and bring the room temperature down to, say 78°. However, in the winter, the residence owner ordinarily will set the heater thermostat to a lower temperature, for example, 70°. When the temperature falls below, say, 68°, the heater is turned on until the room temperature increases, to 70°.

The lower room temperature in the winter causes more rapid transfer of heat from outer bi-metal elements 11 and 21 in the winter than is the case in the summer. Therefore, a higher value of $I_{total}$ is required in the winter before bi-metal elements 11 and 21 expand enough to cause sufficient rotation of rod 19 to close either of switches SS1 or SS2 (thereby causing shedding of lower priority loads). In some instances, this type operation may be desirable, since in some locations of the country electric rates are lower during the winter months and it may be desirable to the residential homeowner that he be able to utilize more electrical energy in the winter before experiencing any inconvenience due to shedding of loads.

However, if it is desirable to take advantage of the capability of energy controller 1 to reduce "peaking" of the residence owner's power consumption during the winter months as well as during the summer months, it will be necessary to provide adjustability in the relationship between I' and $I_{total}$ in order to account for the amount of counterclockwise rotation of bi-metal elements 11 and 21 due to the lower indoor winter temperature settings established by most residence owners. This can be accomplished in a variety of ways, one being the provision of variable resistor 44 for controllably shunting a portion of the current I' from flowing through bi-metal elements 11 and 21, thereby providing a variable approximate demand level.

A very significant aspect of the energy controller 1 of the present invention is that a thermostat setting controlling a temperature at which a particular load is automatically switched on or off varies as a function of total load current or power being delivered to the residence. For example, during actual operation in the summer, most energy controllers will cause the interior room temperature in the residence to be somewhat higher due to the fact that the air conditioning operation is being occasionally postponed in order to allow lower priority loads to be turned on for at least a minimum amount of time. This is usually accomplished by means of a complex computer controlled circuit (that may be prone to various kinds of unreliability and operating anomalies). Such difficulties are overcome by the energy controller of the present invention, which inherently and automatically increases the thermostat setting as a function of total load current delivered to the residence (as a result of the rotation of bi-metal coil 27 caused by rod 19 in response to $I_{total}$). For example, during a hot summer day, the total electrical loading in the middle of the afternoon may be quite high. This will cause the "effective" air conditioner thermostat setting to be increased from, say, 78° to 83°. However, later, during the early evening hours, if the electrical loading of the residence decreases substantially, the "effective" air conditioner thermostat setting is automatically lowered to a much more comfortable temperature. The residence occupants thereby experience discomfort only for a small period of time, yet the peak power drawn by the residence is kept relatively low, thereby avoiding a high billing rate for the present billing period set up by the electric utility company.

It can be seen that the device of FIG. 1 is far more flexible in its operation than the above-mentioned interlock device. Yet, the device of FIG. 1 is mechanically quite simple, is less prone to "tinkering" that defeats the purpose of the device by the residence user, avoids excessive power peaking in most instances, but causes the air conditioning to be turned on if the room temperature exceeds a predetermined maximum temperature.

It should be noted that analagous operation can be obtained to reduce the temperature of an electric heater controlled by a mercury thermostat such as TS1.

Figure 6:
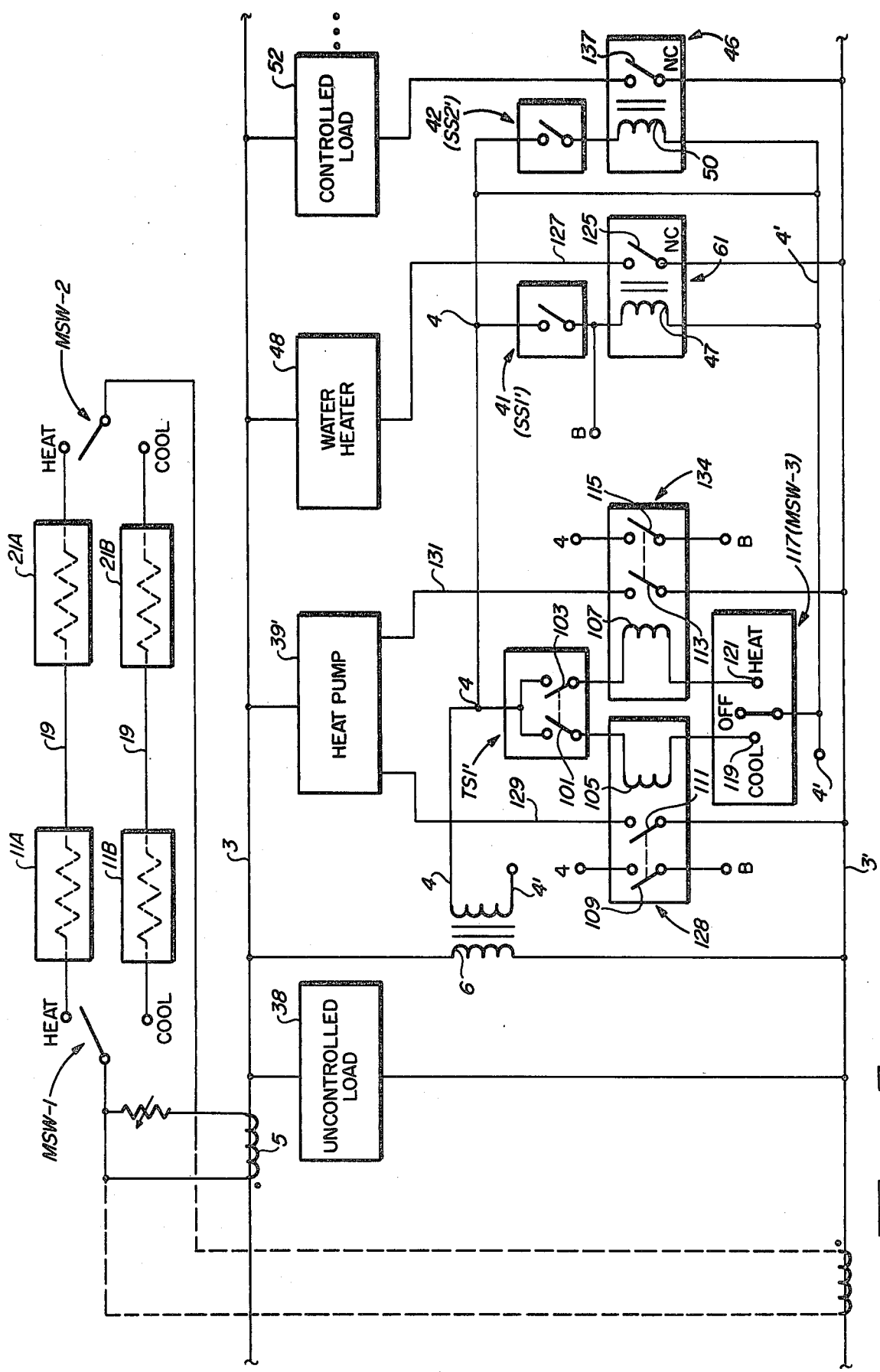
FIG. 6 is a diagram useful in conjunction with FIG. 5 in describing the alternate embodiment of the invention.

The above-described arrangement of FIGS. 1 and 1A is satisfactory for the case when it is desired to curtail summer peaking of total power or current to the residence by curtailing the air conditioner 39 and also curtailing various other controlled loads. However, the device of FIGS. 1 and 1A must be modified if it is desired to curtail winter peaking, wherein a heater, rather than an air conditioner, is operated. To this end, the embodiment of the invention shown in FIGS. 5 and 6 is referred to. Where appropriate in FIGS. 5 and 6, the same reference numerals are used to designate identical or corresponding elements as in FIGS. 1 and 1A.

Referring now to FIG. 5, the bi-metal elements and switches shown in FIG. 1 are again shown, and two additional bi-metal elements 11A and 21A are also included to accomplish control of a heater unit, which may be combined with the refrigeration unit of FIG. 1 in a widely used device known as a "heat pump".

In FIG. 6, the new elements shown include bi-metal coils 11A and 21A, both of which spiral in the same sense relative to rod 19 as bi-metal coils 11B and 21B (which correspond to bi-metal coils 11 and 21, respectively, of FIG. 1). However, bi-metal coils 11A and 21A have the characteristic that they contract, rather than expand, when heated, and thereby urge rod 19 to rotate counterclockwise. As in FIG. 1, bi-metal coils 11B and 21B expand when heated, urging rod 19 to rotate clockwise. When the energy controller 1' of FIGS. 5 and 6 is operated to curtail the air conditioning function, bi-metal coils 11B and 21B operate in essentially the same way as the embodiment of the invention shown in FIG. 1.

In FIG. 5, all of the bi-metal coils are mounted on a rotatable platform 146 or the like. Platform 147 is connected to a rotary calibrated scale 149. Platform 147 can be rotated in the directions indicated by arrow 151 to manually vary the thermostat settings of the air conditioning function and the heating function controlled by the energy controller 1' of FIGS. 5 and 6.

In FIG. 5, the thermostat switch TS1' corresponds to switch TS1 of FIG. 1, and is mounted on the free end of thermostat bi-metal element 27, which corresponds precisely to bi-metal element 27 in FIG. 1. However, in FIGS. 5 and 6, TS1' can be a single pole double throw mercury switch. As subsequently explained in more detail, TS1' can also consist of two single pole, single throw mercury switches, each of which have the desired amount of "histeresis" to determine the amount that the room temperature varies between the temperature at which the unit being controlled (i.e., the air conditioner or the heater) switches on and off.

For purposes of the following discussion, it will be assumed that TS1' is a conventional single pole double throw mercury switch. The mercury bubble of switch TS1' can close either switch element 101 or 103 thereof, depending on the direction of tilting of switch TS1'.

In FIG. 6, two "ganged" mode switches MSW-1 and MSW-2 are connected to conductors 7 to selectively route the sense current I' through bi-metal elements 11A and 21A (which contract when heated), when the MSW-1 and MSW-2 switches are in their "heat" position. If switches MSW-1 and MSW-2 are in their "cool" position, then sense current I' is caused to flow through bi-metal coils 11B and 21B, which expand when heated and function entirely analogously to bi-metal coils 11 and 21 of FIG. 1, as previously described.

In heat pump 39' of FIG. 6, if conductor 129 is operatively connected to power line conductor 3', then heat pump 39' functions as a refrigeration unit. Relay 128 includes relay coil 105 and two switches 109 and 111 which are "normally" open, i.e., are open when relay coil 105 is not energized, but are closed when relay coil 105 is energized.

If conductor 131 of heat pump 39' is operatively connected to power line 3', then heat pump 39' functions as a heater. Relay 134 includes relay coil 107 and switches 113 and 115. Switch 113, when closed, connects conductor 131 of heat pump 39' to power line conductor 3'. Switches 113 and 115 are normally opened, but are closed when relay coil 107 is energized.

Reference numeral 117 designates a single pole double throw switch also referred to as switch MSW-3. Its common terminal is connected to control transformer output terminal 4'. Its terminal 119 is connected to relay coil 105 and its terminal 121 is connected to relay coil 107. Switch MSW-3 is ganged with switches MSW-1 and MSW-2, so that when energy controller 1' is configured to control the air conditioning function, control transformer conductor 4' is electrically connected to relay coil 105 and when energy controller 1' is configured to curtail the heater function of heat pump 39', control transformer conductor 4' is connected to relay coil 107.

Switch SS1' and relay 61 are connected in precisely the same relationship to water heater 48 as switch SS1 and relay 61 are connected thereto in FIG. 1. The same is true for SS2' and relay 46 of FIG. 6. However, SS1' and SS2' in FIG. 6 are more complex, since each includes either a single pole double throw mercury switch, or else each includes two separate single pole single throw mercury switches.

For purposes of the immediate following discussion, it will be assumed that SS1' has the configuration shown in FIG. 6A and SS2' has the configuration shown in FIG. 6B. In FIG. 6A, switch SS1' includes a single pole double throw mercury switch having switch closure elements 153A and 153B, which actually represent different positions of a bi-stable mercury bubble. The terminal of mercury switch 153 designated "COOL" is connected to a corresponding terminal of a single pole double throw switch 143, also referred to as switch MSW-4. For convenience, relay 61 is also shown in FIG. 6A.

Similarly, in FIG. 6B, switch SS2' includes single pole double throw mercury switch 155, having switch elements 155A and 155B, which collectively represent two bi-stable positions of a mercury bubble. The terminal of mercury switch 155 designated "COOL" is connected to a corresponding terminal of single pole double throw switch 145, which is also designated as switch MSW-5. A terminal of switch 155 designated "HEAT" is connected to a corresponding terminal of switch MSW-5. Single pole double throw switches MSW-4 and MSW-5 are also ganged with switches MSW-1 and MSW-2. Again, relay 46 is shown in FIG. 6B for clarity.

The operation of the circuit of FIGS. 5 and 6 will now be described. The operation of the "COOL" mode is initiated by manually switching the ganged single pole double throw switches MSW-1 through MSW-5 to their "COOL" positions. The operation of the energy controller in this mode is entirely similar to the operation already described with reference to FIGS. 1 and 1A. However, in FIG. 6, switch 109 of air conditioner relay 128 connects control transformer terminal 4 to accomplish energizing of relay coil 47 of water heater relay 61 when the air conditioning function of heat pump 39' is turned on, whereas in FIG. 1A, conductor 62 accomplishes energizing of relay coil 47 of water heater relay 61 when air conditioner 39 is turned on. In FIG. 6, if I' increases enough to cause shedding of water heater 48, switch 153A of FIG. 6A will close due to the shifting of the mercury bubble in mercury switch 153 of switching device SS1'. This energizes relay coil 47 of water heater relay 61, opening normally closed switch 125 of water heater relay 61 in exactly the same way as for FIG. 1A. Other increases in I' cause mercury switch 155 of switching device SS2' (FIG. 6B) to operate analogously to switch SS2 of FIG. 1A to energize relay coil 50 of relay 46, opening normally closed switch 137 of relay 46 and shedding controlled load 52.

Operation of the circuit of FIGS. 5 and 6 in the "HEAT" mode, wherein all of the ganged switches are switched to their "HEAT" position, is somewhat different. In the "HEAT" mode, heat pump 39' is operated as a heater instead of a refrigeration unit. An increase in I' causes bi-metal coils 11A and 21A to heat up, and thereby contract, and thereby cause counterclockwise rotation of rod 19. This, of course, causes counterclockwise rotation of bi-metal element 27 and hence, also thermostat switch TS1'. Rotation of rod 19 also causes counterclockwise rotation of switching devices SS1' and SS2'.

Assuming that the increase in I' is sufficient to shift the mercury bubble of mercury switch 153 (FIG. 6A) to close switch 153B, then relay coil 47 of water heater relay 61 is energized, opening normally closed switch 125, thereby shedding water heater 48. Water heater 48 remains shed until rod 19 rotates clockwise enough to overcome the histeresis of mercury switch 153 and shift the mercury bubble to its other bi-stable state so that switch 153B opens. The resulting counterclockwise rotation also causes decreasing of the set point at which thermostat switch device TS1' turns the heating function of heat pump 39' on.

As the room temperature decreases, bi-metal coil 27 cools, and thereby contracts, and therefore causes switching device TS1' to rotate counterclockwise. Assuming the room temperature decreases enough to shift the mercury bubble in switching device TS1' to its other bi-stable state, switch element 103 then closes, thereby energizing relay coil 107 of relay 134. This causes normally open switch 113 of relay 134, turning on the heating function of heat pump 319' and also closes normally open switch 115, thereby energizing relay coil 47 of water heater relay 61. This opens normally closed switch 125, thereby shedding water heater 48 so that heat pump 39' and water heater 48 are not on simultaneously, thereby avoiding a large peak in the power delivered to the residence 56. The heating function of heat pump 39' remains on until the room temperature increases sufficiently that the resulting counterclockwise rotation of bi-metal element 27 switches TS1' thereon overcome the "histeresis" of the mercury bubble and shifts the mercury bubble to its other bi-stable state, disconnecting heat pump 39' from its power source and restoring water heater 48, presuming that switch 153 of switching device SS1' (FIG. 6A) is not on.

It can be seen that when the mode switches MSW-1, MSW-2 . . . MSW-5 are switched from the "COOL" positions to their "HEAT" positions, the loss of resistive heating in bi-metal coils 11B and 21B causes them to contract. Furthermore, the resistive heating that now occurs in bi-metal coils 11A and 21A causes them to contract also, so that the two contractions result in a counterclockwise shift of rod 19. The counterclockwise shift of rod 19 in effect shifts the bi-metal coil 27 counterclockwise. Since decreases in room temperature also causes counterclockwise rotation of shaft 19 (since bi-metal coils 11A, 11B, 21A, and 21B are sensitive to room temperature as well as to resistive heating therein), the shift caused by switching from the "COOL" mode to the "HEAT" mode reduces the change in room temperature needed to turn on the heat function of heat pump 39' (i.e., to close switch 153 of FIG. 6A by causing a shift of the mercury bubble to the bi-stable position represented by the closure of switch 153B). The user can compensate for this by manually adjusting the rotary scale 149 mentioned above. Another way of compensating for this shift is to utilize two separate single pole, single throw mercury switches instead of a one single pole double throw mercury switch to implement thermostat switch TS1'. Each such single pole, single throw mercury switch can be positioned so that its mercury bubble is shifted to the desired bi-stable states at the desired respective room temperatures when the energy controller 1' is in either the cooling mode or the heating mode. Similarly, for the same reasons, it may be desirable to implement mercury switches 153 and 155 in FIGS. 6A and 6B by means of respective pairs of single pole, single throw mercury switches having the desired amount of historesis between their bi-stable points.

While the invention has been described with reference to several particular embodiments thereof, those skilled in the art will be able to make various modifications to the disclosed apparatus and methods without departing from the true spirit and scope of the invention. For example, other types of switches then mercury switches can be utilized. The same functions can be implemented by those skilled in the art utilizing appropriate cams and cam actuated switches (as shown in FIG. 3), although perhaps less conveniently. Optoelectronic switching devices can also be utilized to detect the amounts of deflection of the various bi-metal elements required in order to initiate shedding or restoring actions by the energy controller system. However, additional electronic circuitry and electronic support circuitry, such as power supplies, will be required. Although in the disclosed embodiments of the invention the resistive heating of the bi-metal elements in response to a sense current representative of the total power or current being delivered to the residence have been utilized, other means can be provided for varying the temperature of the bi-metal elements in response to changes of total power consumption of the residence or establishment. If control circuitry 57, as shown in FIG. 4, contains circuitry responsive to both rising and falling edges of signals produced in response to each of a plurality of mercury switches 64 on shaft 19, the priority of shedding various controlled loads can be arranged to be different than the priority of restoring the same loads.

I claim:

1. A system for controlling the amount of electrical energy delivered from a power line to an establishment having a plurality of electrical loads, including first and second controlled loads, in order to reduce peak electrical loading by the establishment by avoiding simultaneous operation of said first and second controlled loads, said system comprising in combination:
   (a) means for sensing a quantity related to the amount of power being delivered to said plurality of electrical loads;
   (b) first temperature sensitive means having a portion that deflects in response to a change in the temperature of said first temperature sensitive means caused by a change in said quantity, wherein said first temperature sensitive means includes a first bi-metal coil having a first end portion and a second end portion, said second end portion undergoing rotational deflection relative to said first end portion in response to changes in temperature of said first bi-metal coil;
   (c) means responsive to said sensing means for heating said first temperature sensitive means to a temperature related to the amount of power being delivered to said plurality of electrical loads;
   (d) thermostatic means for switching from one state to another when a temperature of said thermostatic means varies from a level below a first set point temperature to a level above said first set point temperature, said first thermostatic means controlling said first controlled load, wherein said thermostatic means includes a second bi-metal coil having a first end portion and a second end portion that undergoes rotational deflection relative to said first end portion of said second bi-metal coil in response to changes in the temperature of said second bi-metal coil, said coupling means connecting said second end portion of said first bi-metal coil to said first end portion of said second bi-metal coil, the total amount of rotational deflection of said second end portion of said second bi-metal coil being determined by both an amount of change of temperature of said second bi-metal coil and an amount of change in the total power being delivered to the establishment; and
   (e) means coupling said thermostatic means to said portion of said first temperature sensitive means for changing said first set point temperature in response to changes in the amount of power being delivered to said plurality of electrical loads.

2. The system of claim 1 wherein said sensing means produces a current that is related to the amount of power being delivered to said plurality of electrical loads, and wherein said heating means includes electrically resistive material in said first bi-metal coil and electrical conductors for electrically connecting said electrically resistive material to said sensing means to cause said current to flow through said electrically resistive material.

3. The system of claim 2 wherein said thermostatic means includes first switching means responsive to said second end portion of said second bi-metal coil and having first and second electrical states, the rotational position of said second end portion of said second bi-metal coil determining whether said first switching means is in said first electrical state or said second electrical state, said first switching means causing said first controlled load to be turned on and off when said first switching means is in said first and second electrical states, respectively.

4. The system of claim 3 further including second switching means responsive to said second end portion of said first bi-metal coil, said second switch means being electrically coupled to effect controlling of said second controlled load.

5. The system of claim 4 wherein:
   (a) said first controlled load includes an air conditioning device that changes the air temperature in the establishment;
   (b) said thermostatic means is responsive to the temperature of air in the establishment, the temperature of said second bi-metal coil being related to the temperature of said air in the establishment; and
   (c) said second controlled load includes a water heater.

6. The system of claim 5 wherein:
   (a) said first and second switching means each includes a mercury switch having two stable states;
   (b) said second switching means has two stable states and said second switching means is coupled to a relay coil of said water heater to effect shedding of said water heater when said second switching means is in a first one of its electrical states; and
   (c) said first switching means is also coupled to the relay coil of said water heater to effect shedding of said water heater when said first switching means is in its first electrical state.

7. The system of claim 6 wherein said air conditioning device includes means for operating to cool air in the establishment.

8. The system of claim 6 wherein said air conditioning device includes means for operating to heat air in the establishment.

9. The system of claim 7 or claim 8 further including a third controlled load and third switching means responsive to said second end portion of said first bi-metal coil to effect shedding of said third controlled load.

10. The system of claim 6 wherein said means coupling said first thermostatic means to said portion of said first temperature sensitive means includes a conductive member for supporting said first thermostatic means, effecting conducting of said current through said second end portion of said first bi-metal coil, and supporting said second switching means.

11. The system of claim 5 wherein:
   (a) the temperature of said bi-metal coil is also responsive to changes in air temperature of the establishment, and wherein the amount of rotational deflection of said second end portion of second bi-metal coil in response to a particular change in air temperature is substantially greater than the amount of rotational deflection of said second end portion of said first bi-metal coil in response to that change in air temperature; and (b) as air temperature in the establishment continues to change in a particular direction after said air conditioning device has been shed in response to increasing of the total power delivered to said plurality of electrical loads, said second bi-metal coil continues to rotationally deflect until said air conditioning device is restored to prevent the air temperature from being outside of a predetermined range regardless of the amount of total electric power less than a predetermined maximum being delivered to said plurality of electrical loads.

12. The system of claim 11 wherein:
(a) said air conditioning means includes both means for heating air in the establishment and means for cooling air in the establishment;
(b) said system includes a third bi-metal coil that is temperature-responsive to said current, and has an end portion that tends to rotate in a direction opposite to the direction in which the second end of said first bi-metal coil would tend to rotate in response to a particular change in total power being delivered to the establishment;
(c) current switching means are connected for switching said current to effect heating of said first bi-metal coil in response to total power being delivered to the establishment for summer operations and to effect heating of said second bi-metal coil in response to total power being delivered to the establishment for winter operations; and
(d) said thermostatic means also switches from one state to another when a temperature of said thermostatic means varies from a level above a second set point temperature to a level below said second set point temperature, and said thermostatic means also controls both said cooling means and said heating means, said thermostatic coupling means also changing said second set point temperature in response to changes in the amount of power being delivered to said plurality of electrical loads.

13. A method for controlling the amount of electrical energy delivered from a power line to an establishment having a plurality of electrical loads, including first and second controlled loads, in order to reduce peak electrical loading by the establishment, by avoiding simultaneous operation of said first and second controlled loads, said method comprising the steps of:
(a) sensing a quantity related to the amount of power being delivered to said plurality of electrical loads;
(b) heating a first temperature sensitive means to increase its temperature by an amount related to the amount of power being delivered to said plurality of electrical loads in response to said sensing;
(c) deflecting of a portion of said first temperature sensitive means in response to said change in temperature of said first temperature sensitive means by an amount related to the amount of said increase in temperature, wherein said first temperature sensitive means includes a first bi-metal coil having a first end portion and a second end portion, said deflecting producing rotational deflection of said second end portion relative to said first end portion in response to changes in temperature of said first bi-metal coil;
(d) switching a thermostatic means from one state to another when a temperature of said thermostatic means varies from a level below a first set point temperature to a level above said first set point temperature, said thermostatic means controlling said first controlled load; and
(e) coupling said thermostatic means to said portion of said first temperature sensitive means to change said first set point temperature by an amount corresponding to a change in the amount of power being delivered to said plurality of electrical loads, wherein said thermostatic means includes a second bi-metal coil having a first end portion and a second end portion that undergoes rotational deflection relative to said first end portion of said second bi-metal coil in response to changes in the temperature of said second bi-metal coil, said coupling including translating deflecting of said second end portion of said first bi-metal coil to said first end portion of said second bi-metal coil, the total amount of rotational deflecting of said second end portion of said second bi-metal coil being determined by both an amount of change of temperature of said second bi-metal coil and an amount of change in the total power being delivered to the establishment.

14. The method of claim 13 including producing a current that is related to the amount of power being delivered to said plurality of electrical loads, in response to said sensing, wherein said heating is achieved by means of electrically resistive material in said first bi-metal coil and electrical conductors for electrically connecting said electrically resistive material to said sensing means to cause said current to flow through said electrically resistive material.

15. The method of claim 14 wherein said thermostatic means includes first switching means responsive to said second end portion of said second bi-metal coil and having first and second electrical states, said method including causing said first switching means to assume said first electrical state or said second electrical state in response to the rotational position of said second end portion of said second bi-metal coil, said first switching means causing said first controlled load to be turned on and off when said first switching means is in said first and second electrical states, respectively.

16. The method of claim 15 further including actuating second switching means in response to rotational deflection of said second end portion of said first bi-metal coil to effect controlling of said second controlled load.

17. The method of claim 16 wherein said first controlled load includes an air conditioning device, said method including changing the air temperature in the establishment by means of said air conditioning device and changing the temperature of said second bi-metal coil to a temperature related to the temperature of said air in the establishment, wherein said second controlled load includes a water heater.

18. The method of claim 17 wherein said first and second switching means each includes a mercury switch having two stable states, said second switching means having two stable states, said method including actuating a relay coil of said water heater to effect shedding of said water heater when said second switching means is in a particular one of its electrical states, said method including actuating a relay coil of said water heater to effect shedding of said water heater when said first switching means is in its first electrical state.

19. The method of claim 18 including operating said air conditioning device to cool air in the establishment.

20. The method of claim 18 including operating said air conditioning device to heat air in the establishment.

21. The method of claim 19 or claim 20 further including actuating a third switching means in response to rotational deflection of said second end portion of said first bi-metal coil to effect shedding of a third controlled load.

22. The method of claim 18 wherein said means coupling said thermostatic means to said portion of said temperature sensitive means includes a conductive member, said method including conducting of said current through said conductive member and said second end portion of said first bi-metal coil.

23. The method of claim 17 wherein the temperature of said first bi-metal coil is changed in response to changes in air temperature of the establishment, and wherein the amount of rotational deflection of said second end portion of second bi-metal coil in response to a particular change in air temperature is substantially greater than the amount of rotational deflection of said second end portion of said first bi-metal coil in response to that change in air temperature, said method including continuing to rotationally deflect said second bi-metal coil until said air conditioning device is restored to prevent the air temperature from being outside of a predetermined range regardless of the amount of total electric power less than a predetermined maximum being delivered to said plurality of electrical loads.

24. The method of claim 23 wherein said air conditioning means includes both means for heating air in the establishment and means for cooling air in the establishment, said method including actuating a current switching means to switch said current from said first bi-metal coil to effect heating of a third bi-metal coil instead of said first bi-metal coil in response to total power being delivered to the establishment to effect heating of said third bi-metal coil;

deflecting an end portion of said third bi-metal coil in response to said current, and urging said end portion of said third bi-metal coil to rotate in a direction opposite to the direction in which the second end of said first bi-metal coil would tend to rotate in response to a particular change in total power being delivered to the establishment;

switching said thermostatic means from one state to another when a temperature of said thermostatic means varies from a level above a second set point temperature to a level below said second set point temperature, said thermostatic means also controlling both said cooling means and said heating means, said thermostatic coupling means also changing said second set point temperature in response to changes in the amount of power being delivered to said plurality of electrical loads.

* * * * *